United States Patent [19]
Pieloth et al.

[11] Patent Number: 5,711,346
[45] Date of Patent: Jan. 27, 1998

[54] FLUID CONTROL ELEMENT

[75] Inventors: Manfred Pieloth, Dresden; Dieter Schrepel, Friedewald; Heinz Töpfer, Dresden, all of Germany

[73] Assignee: Burkert Werke GmbH & Co., Germany

[21] Appl. No.: 640,311

[22] Filed: Apr. 30, 1996

[30] Foreign Application Priority Data

May 3, 1995 [DE] Germany .......................... 29507380 U

[51] Int. Cl.$^6$ .............................................. F16K 11/044
[52] U.S. Cl. .................................... 137/625.44; 251/231
[58] Field of Search ....................... 137/625.44; 251/231, 251/298

[56] References Cited

U.S. PATENT DOCUMENTS

| | | | |
|---|---|---|---|
| 2,876,553 | 3/1959 | Tomkow | 251/231 X |
| 4,333,390 | 6/1982 | Hegg | 137/625.44 X |
| 4,765,370 | 8/1988 | Grügumi et al. | 137/625.44 X |
| 5,040,567 | 8/1991 | Nestler et al. | 137/625.44 |

FOREIGN PATENT DOCUMENTS 2530362  7/1975  Germany .

*Primary Examiner*—John Fox
*Attorney, Agent, or Firm*—Sixbey, Friedman, Leedom & Ferguson, P.C.; Gerald J. Ferguson, Jr.; Tim L. Brackett, Jr.

[57] ABSTRACT

A fluid control element has a housing (10), a fluid control space (12) formed in the housing and into which at least two flow ducts (16) open, at least one sealing seat (14) arranged in the fluid control space (12) and associated with one of the flow ducts and a movable lug (30) extending into the fluid control space (12), the lug (30) being encased in an elastic material and being able to cover the sealing seat and constituting one arm of a reed. Furthermore, two rotary joints are provided for the reed which are formed by a tightly surrounding casing which is fashioned of the elastic material and is held in the housing. The second arm of the reed extends out from the control space (12) as an actuating arm (22). The two rotary joints arranged opposite to one another transversely in relation to a longitudinal direction of the lug (30) in opposite housing walls with the result that the control element may be moved independently from the pressure in the fluid control space (12).

13 Claims, 5 Drawing Sheets

FLUID CONTROL ELEMENT

The present invention relates to a fluid control element comprising at least one valve seat formed therein and a reed with a lug pivotally mounted in a housing for selectively opening and closing of said valve seat.

Fluid control elements as disclosed in DE 1,037,225 B and DE 2,530,362 C2 comprise a reed with a lug pivotally secured to a housing by two pivot joints. The pivot joints are formed by projections of elastic material surrounding parts of the reed and being fixed to the housing. Two flow ducts opening into a fluid control space formed within the housing are opened or closed by pivoting the lug in a corresponding direction. The disadvantage of these known control elements is that high pressure in the control space may affect the position of the lug in an undesired manner. Accordingly also the mobility of the lug and the resistance, due to the pivot joints, to motion of the lug is dependent on the pressure in the fluid control space. In addition, the pressure acting on those sides of the pivot joints which do not adjoin the fluid control space will affect the mobility of the lug and the resistance to being moved.

DE 1,247,793 C discloses a fluid control element, in the case of which a lug extending into the fluid control space is rigidly connected with a pivot-mounted armature of an electromagnetic drive. The electromagnetic drive is separated from the fluid control space by a diaphragm which is provided with a pocket able to receive the lug. The lug is moved between two oppositely placed valve seats which it alternately clears and closes. The diaphragm which is held at its peripheral edge has a funnel-like transitional region facing the pocket in which the lug is inserted in order to oppose its movement out of position with only a small resisting force. In this transitional region, the diaphragm is, however, not supported and can, therefore, not withstand any substantial pressure differences. Moreover, it is subjected to a massive load, since it is alternatingly subjected to a stretching and compressing force.

An object of the invention is to provide a fluid control element with a lug as a part of a two-armed lever within a fluid control space, the lug being movable independently of pressure within the fluid control space.

In accordance with the invention, a fluid control element is provided which comprises a housing in a fluid control space which is formed in the housing and into which at least two flow ducts open. At least one sealing seat is arranged in the fluid control space and associated with one of the flow ducts. A reed forms a two-armed lever whereof one arm is formed by a lug extending into the fluid control space and moveable between a closed position in which it covers the sealing seat and an open position in which it clears the sealing seat. A second arm of the reed extends out from the fluid control space forming an actuating arm. Two rotary joints are formed by a casing of elastic material which closely surrounds at least the lug adjacent portions of the reed where the casing is held between opposed wall portions of the housing for attaching the reed in a pivotal manner to the housing. The rotary joints are arranged opposite to one another transversely in relation to a longitudinal direction of the lug. Owing to this completely symmetrical design on the one hand and owing to the employment of rotary joints on the other hand there is no displacement of the lug under high pressures in the fluid control space. Axial forces acting on the rotary joints accordingly cancel each other out. Furthermore, rotary joints are characterized by a longer working life than pivot joints, which are under a heavy tensile load. In the regions under a heavy tensile load cracks may quickly appear in the elastic material, which may later develop into leaks.

The invention makes available a fluid control element in the case of which sealing means for the fluid control space toward a drive side is hardly deformed by the movement of the reed and withstands high pressure differences between the fluid control space and the drive side. Since the pivot axis of the reed is at the point of intersection between the fluid control space and the drive side, the movement out of position of the reed is extremely small in this region. The displacement of the elastic casing is correspondingly small, such casing serving simultaneously as a seal and as a bearing element.

In accordance with a preferred development, adjacent to the rotary joints the casing is provided with a full supporting effect, since the rotary joints are formed by clamping of the casing between housing parts. The casing functioning as a rotary joint and at the same time as a seal is consequently able to withstand extremely high pressure differences between the fluid control space and the drive side.

In the case of the preferred embodiment of the control element, the reed has a bearing arm arranged to extend transversely in relation to the longitudinal direction of the lug. The reed is tightly surrounded by the casing and the rotary joints are formed on outer end portions of the bearing arm. This type of bearing means is characterized both by a great ability to yield so that drive forces may be kept low and also by a perfectly regular position of the pivot axis so that wobble of the lug is substantially prevented despite its being borne in elastically yielding material.

It is an advantage if end portions of the bearing arm received in the rotary joints have a rectangular cross section. In the case of a round cross section there is the disadvantage that the corresponding end portions must be bonded in the rotary joints in order not to slide in the rotary joint during a pivotal movement. Outer end portions having a rectangular cross section, on the contrary, only require to be thrust into corresponding openings in the rotary joints.

In the case of a preferred embodiment, the housing comprises two flat and at least approximately identical housing parts fitted together along a parting plane and which may be simply manufactured at a low price. Furthermore, the reed with the lug and the actuating arm is manufactured in one piece with the casing and a sealing gasket surrounding the fluid control space preferably by designing the casing as a molding of elastic material molded around portions of the reed on which the sealing gasket is molded. The control element accordingly merely comprises three parts: two identical housing parts and the combined control and sealing element which is simply placed between the two housing parts which are then fixed together.

Drive forces required for the actuation of the lug are, in a further advantageous embodiment, substantially reduced by fluid feedback. This feedback is produced since in longitudinal direction of the lug between the rotary joints and a free end of the actuating arm the reed has a section which is enclosed in a fluid pressure space formed in the housing; this fluid pressure space is divided up into two fluid pressure chambers sealed off from one another by the casing of the section of the reed. Each of the flow ducts associated with one of the sealing seats is connected with the one of the pressure fluid chambers which is arranged on the same side of the reed as the corresponding sealing seat. The surface of the reed section facing the respective fluid pressure chamber is accordingly acted upon by pressure tending to thrust the lug against the sealing seat placed on the same side. The drive forces to be applied to the actuating arm are correspondingly smaller.

Further features and advantages of the invention are apparent from the following description and from the accompanying drawings to which reference is made. In the drawings, FIG. 1 shows a section taken on the line I—I of FIG. 2 through a first embodiment of the fluid control element.

Figure 1:
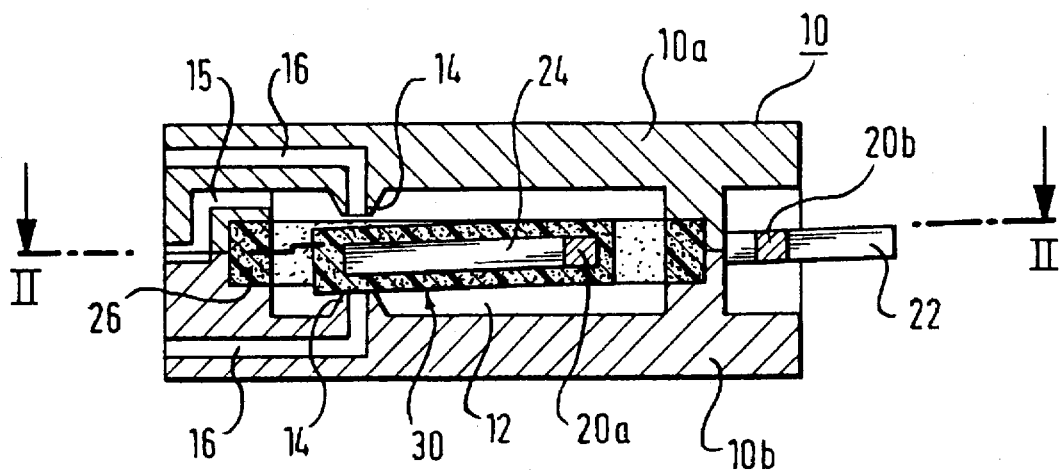
Figure 2:
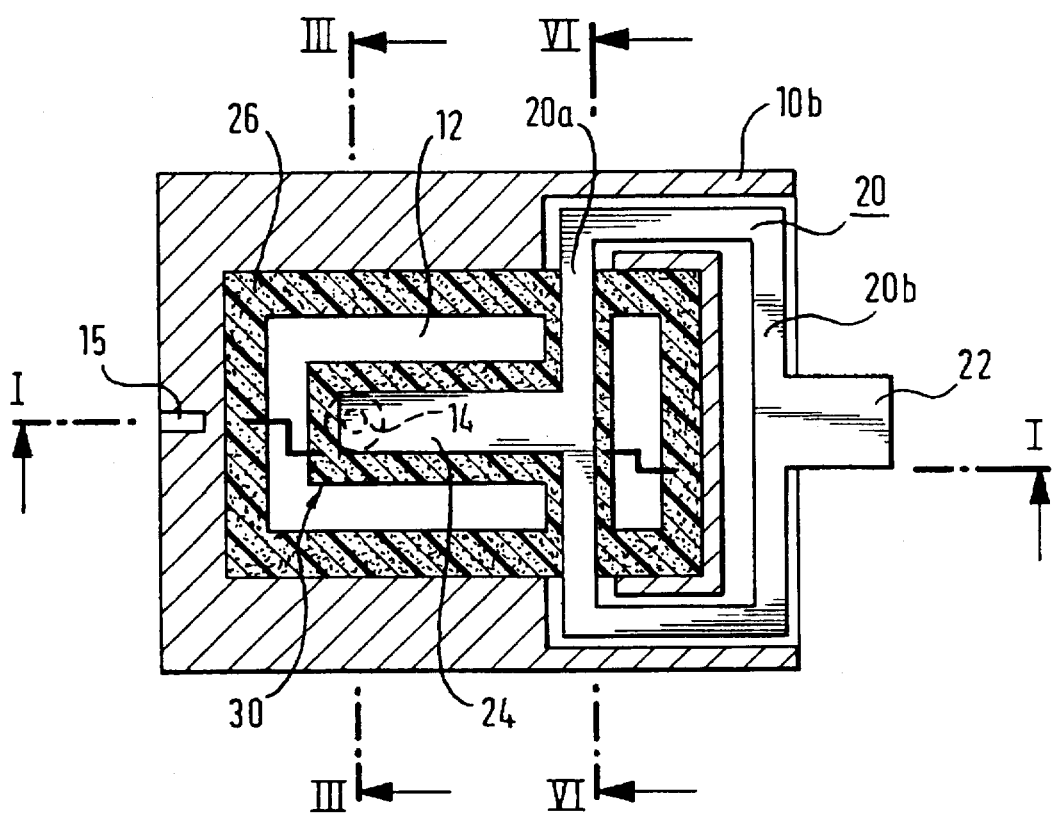
FIG. 2 shows a section of this control element taken on the line II—II of FIG. 1.
Figure 3:
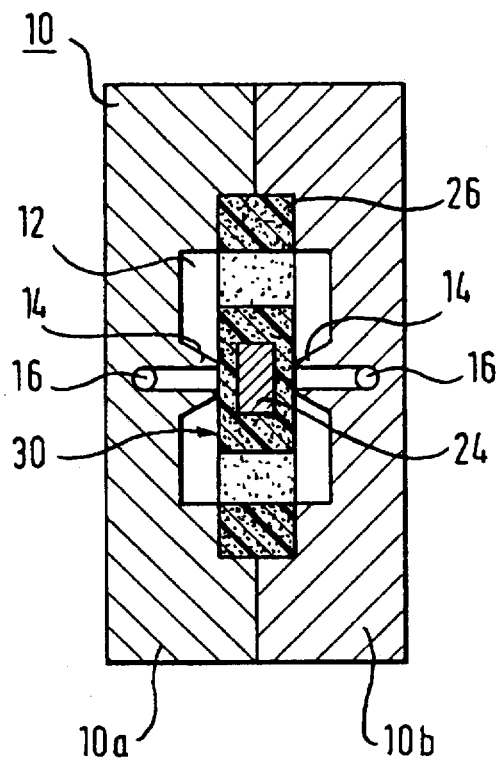
FIG. 3 shows a section through the control element taken on the line III—III of FIG. 2.

FIGS. 7 through 12 diagrammatically show various different embodiments of drives, with which the control element may be coupled.

A fluid control element comprises a generally rectangular block-like housing 10, which is made up of two generally identical housing parts 10a and 10b. Between the housing parts 10a and 10b a fluid control space 12 is formed. Into the fluid control space 12 there extend two mutually opposite sealing seats 14 of which one is formed on the housing part 10a and the other is formed symmetrically on the housing part 10b. From each sealing seat 14 there extends a flow duct 16 which runs with an elbow bend through a wall portion of the respective housing part 10a and 10b and opens at one narrow side of the housing 10.

A further flow duct 15 leads out of the fluid control space 12 through the wall portion of the housing part 10a and opens on the same narrow side of the housing. The two housing parts 10a and 10b differ from one another solely as regards the flow duct 15 which is only formed in the housing part 10a.

Figure 5:
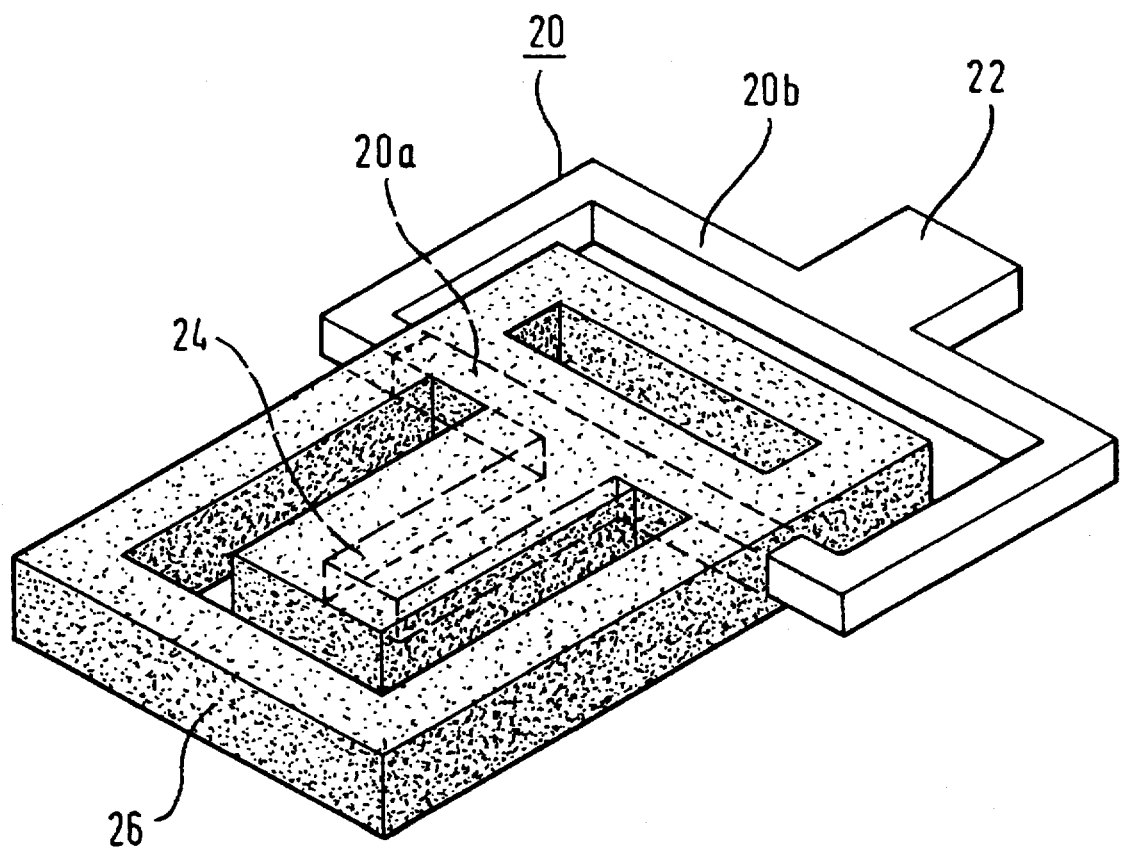
FIG. 5 shows a perspective elevation of a combined control and sealing element for the embodiment illustrated in FIGS. 1 through 4.

Between the housing parts 10a and 10b a combined fluid control and sealing element is held which is illustrated separately in FIG. 5. It comprises a rigid rectangular frame 20 on whose one, long side an actuating arm 22 is connected, and whose opposite side bears a control arm 24, and a sealing gasket 26 of elastic material which constitutes a casing for the control arm 24 and of a side 20a of the frame 20. This combined control and sealing element defines a reed in the form of a two-armed lever whose first arm comprises the control arm 24 and whose second arm is formed by the frame 20 and by the actuating arm 22, the side 20a of the frame 20 forming a bearing arm which is arranged transversely in relation to a longitudinal direction of the control arm 24. The outer ends of this bearing arm project out of the sealing gasket 26. The shorter sides connected with such ends of the frame 20 constitute together with the longer side 20b and the actuating arm 22 a forked lever. The rectangular sealing gasket 26 surrounds the casing of the control arm 24 with a clearance and thus forms an external limit and sealing means for the fluid control space 12.

Figure 4:
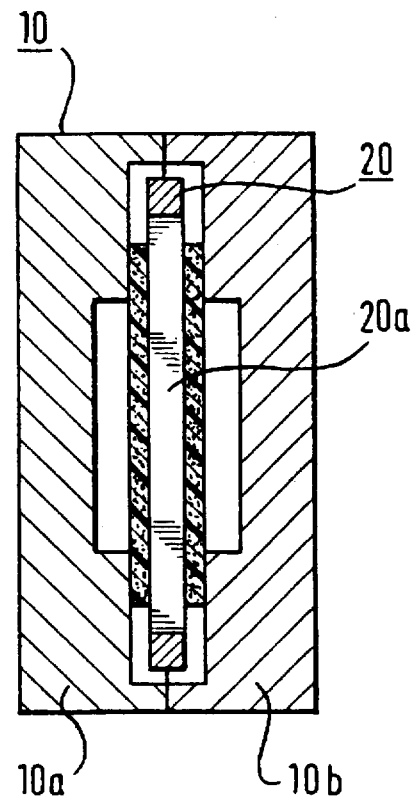
FIG. 4 shows a section through the control element taken on the line IV—IV of FIG. 2.

The bearing arm 20a is, as shown in FIG. 4, clamped on the outer edge of its casing between the housing parts 10a and 10b. The casing of elastic material on outer end portions of the bearing arm 20a constitutes two rotary joints secured to opposite wall portions and consequently pivot bearings for the reed comprising the control arm 24, the frame 20 and the actuating arm 22. The outer end portions of the bearing arm 20a have a rectangular cross section. The control arm 24 together with its casing of elastic material constitute a lug 30 which is able to move between the sealing seats 14, as shown in FIG. 1, and clears one respective sealing seat while it covers over the other one. The actuating of the lug 30 is performed by the actuating arm 22 projecting out of the housing 10 at a narrow side thereof.

The above described fluid control element can be utilized for shutting off, allowing passage, throttling, switching over, mixing or distributing fluid flows. The flow ducts 15 and 16 opening at the narrow side which is opposite to the actuating arm 22 of the housing 10 preferably constitute a standardized fluid interface with which other system elements having suitable interfaces may be coupled. Dependent on the specific purpose of the fluid control element, the actuating arm 22 is coupled with different drive units which are also preferably standardized and, therefore, interchangeable. A plurality of embodiments of such drive units are for example depicted in FIGS. 7 through 12.

Figure 7:
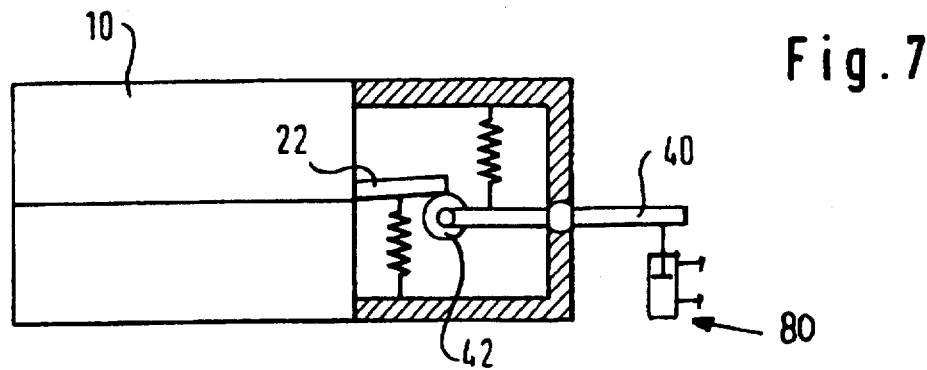

In the embodiment of FIG. 7, mechanical operation with the aid of a pivotally mounted reed 40 is provided for which is in engagement with the end of the actuating arm 22 by means of a follower roller 42. This arrangement constitutes a manual or limit fluid switch although it may be employed as a displacement/pressure transducer as well. As an optional possibility, the reed 40 or the actuating arm 22 directly may be set by means of a fluid drive 80 with a piston and/or a diaphragm.

Figure 8:
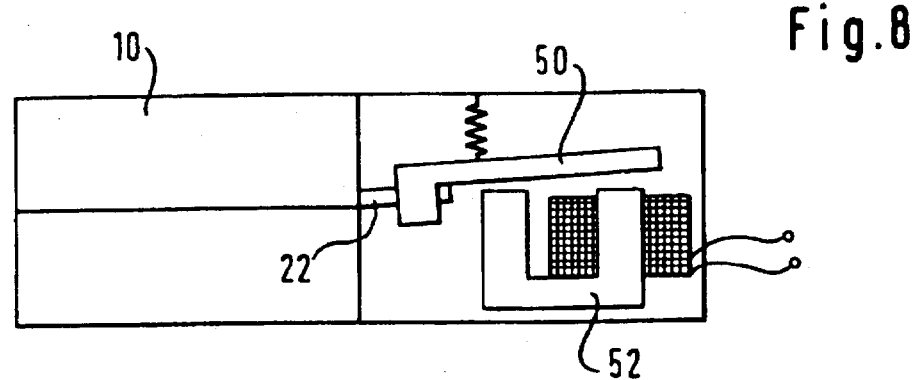

In the illustrated working embodiment of the invention of FIG. 8, the actuating arm 22 is coupled with the armature 50 of an electromagnet 52. This arrangement constitutes a monostable magnetic or solenoid valve.

Figure 9:
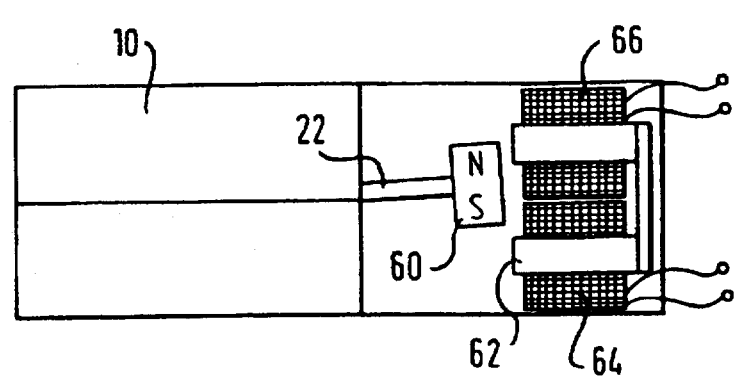

In the arrangement of FIG. 9, a bistable magnetic valve is provided owing to the provision of a permanent magnet 60 which is connected with the actuating arm 22 and which is able to be moved in front of the poles of an electromagnet 62 which possesses two windings 64 and 66. A current pulse in the winding 66 causes the actuating arm 22 to move into the position depicted in FIG. 9 which is maintained in a current-free state by the permanent magnet 60; a current pulse in the winding 64 overrides the holding force of the permanent magnet 60 and switches the actuating lever 22 into the opposite position which in the current-free state is maintained by the permanent magnet 60. Such a bistable magnetic valve is also termed a pulse valve.

Figure 10:
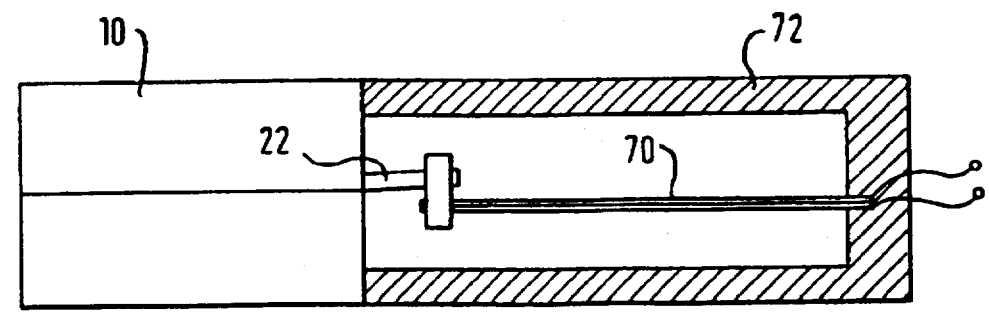

FIG. 10 shows an embodiment of a drive unit which is characterized by a particularly low drive power. The one end of an elongated piezoelectric bend element 70 is coupled with the actuating arm 22, the opposite end of the element 70 being fixedly secured to a frame 72. The bend element 70 comprises two layers of which each one is connected with a lead. The piezoelectric bend element 70 acts electrically as a capacitor. On the application of a voltage a low charging or discharging current will only flow for a short time before rapidly falling to zero. Therefore, control involves an extremely low power. Under the effect of the stored charge the bend element 70 is deflected and entrains the actuating arm 22 with it.

The fluid control element described may also be operated as a proportional valve. For such an application, for example in the embodiment of FIG. 8, an electromagnet is supplied with a varying current. The armature 50 acted upon by a spring urging it into a terminal position is deflected to a degree increasing with the size of the current flowing in the electromagnet. This arrangement may also be termed an analog electrical/pneumatic transducer.

Figure 11:
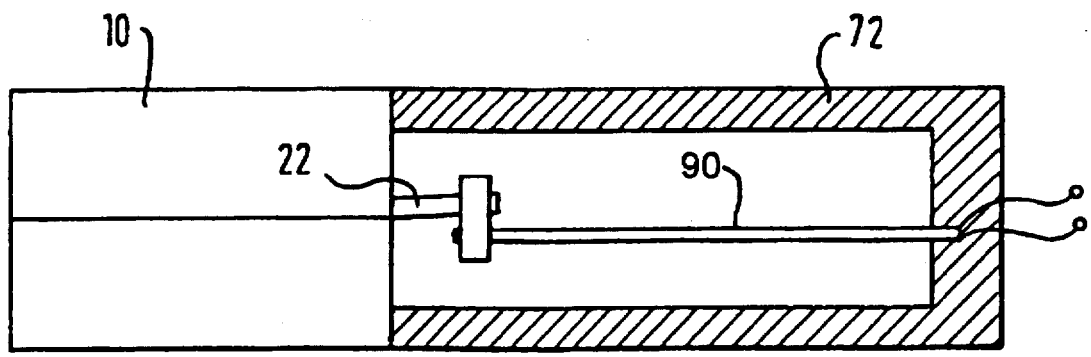

The actuating arm 22 may also, as shown in FIG. 11, be shifted by one or more shape-remembering elements 90. A shape-remembering element 90 ensures that following a deflection of the actuating arm 22 on heating the element 90 the arm will exactly return into its original position.

Figure 12:
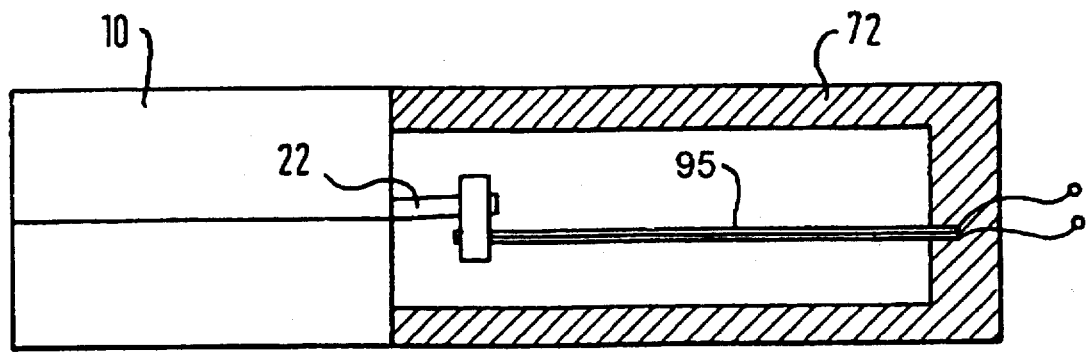

Furthermore, coupling of a bimetallic drive 95, as shown in FIG. 12, is possible with the actuating arm 22, the bimetallic drive 95 being able to be connected for instance with a suitable current source which suitably heats one side of the bimetallic drive 95 in order to deflect the actuating arm 22.

Figure 6:
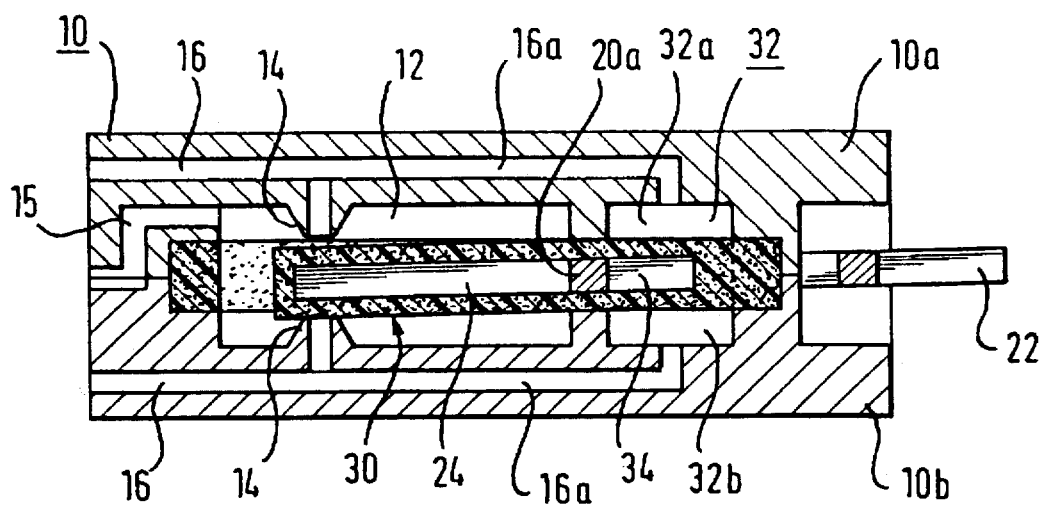
FIG. 6 shows a sectional elevation similar to that of FIG. 1, in the case of which however there is a preferred embodiment of the control element.

In the case of a further development of the fluid control element, as shown in FIG. 6, a fluid pressure space 32 is formed between the housing parts 10a and 10b, such fluid pressure space 32 being divided up by a section 34 of the reed which is placed in longitudinal direction of the lug between the rotary joints and a free end of the actuating arm 22 into two fluid pressure chambers 32a and 32b. The section 34 is, like the control arm 24, completely surrounded by the casing of elastic material. This casing is at the same time a sealing means for the fluid pressure space 32 and provides a sealing function between the fluid pressure chambers 32a and 32b. The flow ducts 16 are extended through the wall of the housing parts 10a and 10b by sections 16a right into the fluid pressure chamber 32a and 32b, respectively. The section 34 is accordingly acted upon by the pressure differential between the fluid pressure chambers 32a and 32b. Since it is located on the actuating side of the reed the pressure differential will produce a force in the fluid pressure chamber 32 supporting the actuating force: The switching system is provided with feedback. With this design the pressure forces occurring at the sealing seats 14 may be at least partially compensated for.

The housing parts 10a and 10b may be manufactured of practically any material economically and in large numbers. They may more particularly be molded in plastic. The combined control/sealing element may be manufactured from a stamped part which has an elastic material partially molded around it, the sealing gasket being molded on it at the same time. Assembly of the control element is something able to be performed extremely simply, since merely two housing parts must be secured together along a parting plane with the combined control/sealing element placed in between.

What is claimed is:

1. A fluid control element comprising a housing, a fluid control space formed in said housing and into which at least two flow ducts open, at least one sealing seat arranged in said fluid control space and associated with one of said flow ducts, an elongate reed forming a two-armed lever whereof one arm is formed by a lug extending into said fluid control space in a longitudinal direction of said reed, and movable between a closed position in which it covers said sealing seat and an open position in which it clears said sealing seat, and wherein a second arm of said reed extends out from said fluid control space forming an actuating arm, said reed further having a bearing arm extending transversely in relation to the longitudinal direction of said reed, said bearing arm having outer ends and at least said outer ends of said bearing arms being tightly surrounded by a casing of elastic material held between opposed wall portions of said housing for attaching said reed in a pivotal manner to said housing.

2. The control element as claimed in claim 1, wherein said casing is clamped between said opposed housing wall portions.

3. The control element as claimed in claim 1, wherein said outer ends of said bearing arm each have a rectangular cross section.

4. The control element as claimed in claim 1, wherein said bearing arm outer ends project laterally out of said casing and are integrally connected with said actuating arm by means of a forked lever.

5. The control element as claimed in claim 1, further comprising a sealing gasket surrounding said fluid control space between said opposed housing wall portions and integrally formed with said casing.

6. The control element as claimed in claim 1, wherein said housing comprises two flat housing parts fitted together along a parting plane.

7. The control element as claimed in claim 1, wherein said housing parts are at least approximately identical in shape.

8. The control element as claimed in claim 1, wherein one sealing seat is arranged on each of said opposed housing wall portions.

9. The control element as claimed in claim 1, further comprising a fluid pressure space formed in said housing, said fluid pressure space accommodating said actuating arm and being divided into two fluid pressure chambers sealed off from one another by said casing, and wherein at least one of said fluid pressure chambers is connected with one of said flow ducts.

10. The control element as claimed in claim 9, wherein each of said flow ducts is associated with one sealing seat and connected with one of the two fluid pressure chambers which is located on the same side of the reed as the sealing seat.

11. The control element as claimed in claim 1, wherein said casing is formed by molding elastic material around portions of said reed.

12. The control element as claimed in claim 1, wherein said housing is generally shaped as a rectangular block and wherein said flow ducts extend through housing walls to a narrow side of said housing.

13. The control element as claimed in claim 1, wherein said actuating arm is adapted to be selectively coupled with any of a manual actuating element, an electromagnet, a pulse-operated electromagnetic drive, a piezoelectric drive, a proportional drive, a fluid drive with a piston and/or a diaphragm, a bimetallic drive, a drive with shape-remembering elements.

* * * * *